United States Patent

[11] 3,568,129

[72] Inventors Percy Ernie Gold
53 Nascat Wood Road, Watford, Hertfordshire;
Harold E. J. Kemp, 38 School Road, Ashford, Middlesex, England

[21] Appl. No. 781,418
[22] Filed Dec. 5, 1968
[45] Patented Mar. 2, 1971
[32] Priority Dec. 5, 1967
[33] Great Britain
[31] 55,334

[54] DEVICE FOR FACILITATING THE TESTING OF EXPERIMENTAL CIRCUITS
9 Claims, 7 Drawing Figs.

[52] U.S. Cl. .......... 339/17, 29/626, 174/68.5, 317/101, 324/158
[51] Int. Cl. .......... H05k 1/04, H05k 3/36
[50] Field of Search .......... 174/68.5, (FP); 317/101 (B), 101 (C), 101 (CC), 101 (CM), 101 (CP), 101 (D); 339/17, 17 (C), 17 (CF); 29/629; 35/19.1; 324/—158 (F), 158 (T)

[56] References Cited

UNITED STATES PATENTS

| | | | |
|---|---|---|---|
| 3,177,315 | 4/1965 | Clare | 317/101CPX |
| 3,335,327 | 8/1907 | Damon et al. | 317/101CP |
| 3,380,016 | 4/1968 | Samson et al. | 317/101CPX |

*Primary Examiner*—Darrell L. Clay
*Attorney*—Malcolm W. Fraser

ABSTRACT: The invention resides in a circuit board for receiving a plurality of integrated circuits in order that the integrated circuits can be patched up in various arrangements as desired, some at least of the integrated circuit receiving stations are removable from the board so that they can be interchanged with stations for receiving different types of integrated circuit.

DEVICE FOR FACILITATING THE TESTING OF EXPERIMENTAL CIRCUITS

This invention relates to circuit boards.

The development of integrated circuits, which are very small, has required the development of apparatus whereby a plurality of integrated circuits can be easily interconnected for building and testing circuits. For this purpose, a circuit board has already been proposed having a plurality of integrated circuit receiving stations, each comprising a set of electrical connectors (which are sockets), means for mounting an integrated circuit at the station and conductors which connect the terminals of an integrated circuit when mounted at the station to respective ones of said connectors. Using leads, the connectors of each station can be interconnected and/or connected to the connector of other stations to build up a desired circuit arrangement.

Since there are several different forms of integrated circuit and since the mounting means would only be suitable for one type of integrated circuit, adapters have been proposed whereby, by mounting an adapter on a station, that station can receive an integrated circuit of a type different from that for which the station was designed. A problem with the adapters is that they plug into the aforesaid sockets so that additional and undesireable contact resistances result. Furthermore, when patching up electrical circuit arrangements requiring the use of several boards, it is known to stack the several boards in a rack. A further problem with the adpators is that they increase the effective thickness of the board with the result that the rack has to be designed to space the boards more widely than desirable.

The present invention solves these problems in that at least some of the stations are provided on carriers which are removable from the board. Hence the board can be made to receive different types of integrated circuits simply by interchanging existing stations with other stations designed to receive another type of integrated circuit, as necessary. This avoids the undesirable contact resistances and increase in the effective thickness of the board which result from the use of adapters to enable the board to receive different types of integrated circuits.

Preferred embodiments of the invention are described with reference to the accompanying drawings in which.

Figure 2:
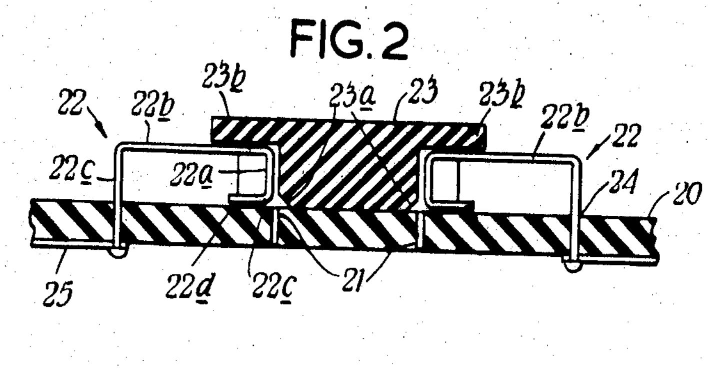
FIG. 2 is an enlarged sectional view of part of one form of an integrated circuit receiving station of the circuit board shown in FIG. 1.
Figure 3:
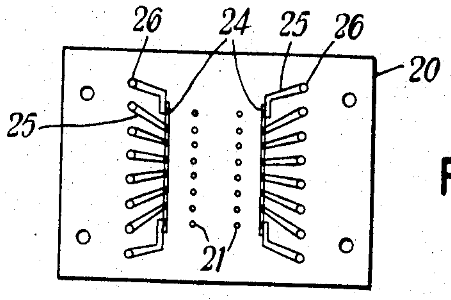
FIG. 3 is a plan view, substantially to scale, of the station shown in FIG. 2.
Figure 6:
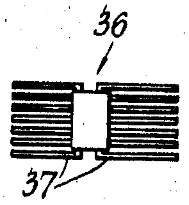
Figure 5:
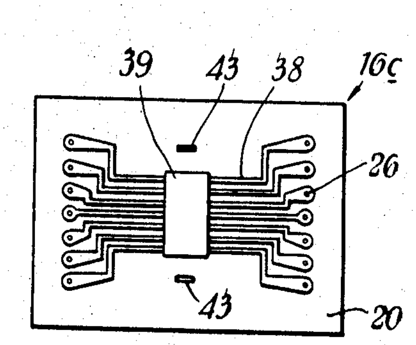
Figure 7:
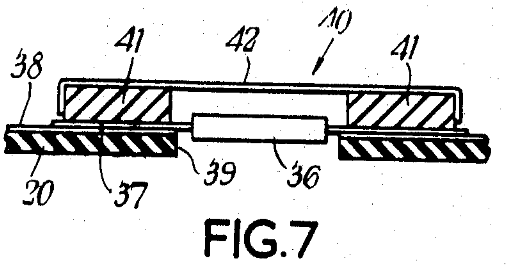

FIG. 4A, B and C are enlarged plan views of three alternative forms of a connecting device for several leads, which can be used on the circuit board;

FIG. 5 is a plan view, substantially to scale, of a station adapted to receive an integrated circuit of a type different from that for which the station of FIGS. 2 and 3 is designed;

I FIG. 6 is a plan view, also substantially to scale, of an integrated circuit module which can be received by the station shown in FIG. 5; and FIG, 7 is an enlarged cross-sectional view showing the module of FIG. 6 received by the station of FIG. 5.

The circuit board according to the present invention comprises a base 10 of insulating material to which is applied a plurality of conducting bus bars 12 in the form of printed circuit strips. A plurality of apertures 14 are formed in the base 10 and are spaced regularly along the base.

Figure 1:
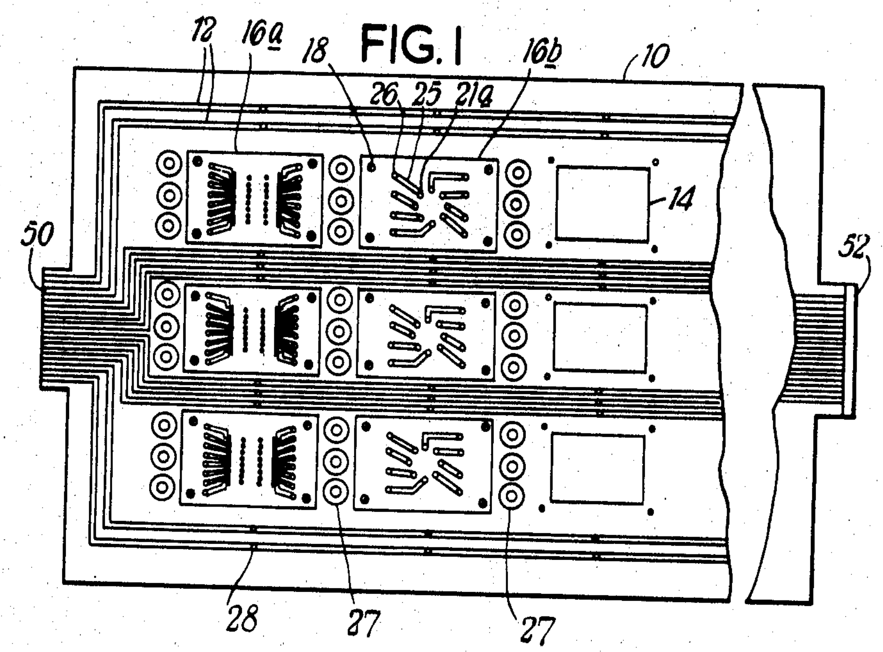
FIG. 1 is a plan view of part of a circuit board according to the invention.

At each of these apertures 14 is provided an integrated circuit receiving station 16. The design of each station 16 is dependent upon the form of the integrated circuit module to be mounted thereon. In FIG. 1, two different station types **16*a* and 16*b* are shown; one 16*a* is for the reception of the so-called "dual-in-line" type of module and the other 16*b* for the so-called "Transistor-Outline" (T.O.) series module. Each station 16 is provided on a carrier in the form of a plate 20 of insulating material secured to the base 10 by screws 18** or similar fastening means to enable the station to be readily removed from the base and interchanged for one of a different type.

For mounting the "dual-in-line" type of module, each station **16*a* has, as shown in enlarged detail in FIG. 3, eight pairs of apertures 21 arranged in the central portion of the plate 20. The spacing and dimensions of these apertures 21 are such that the eight pairs of terminals of a standard dual-in-line type of module can be inserted therethrough. (Modules having up to 25 terminal pairs are known and a station board for use with such a module will have the corresponding number of apertures 21**).

On the rear side of the plate 20 is a support block 23 of insulating material and, associated with each aperture 21, a spring 22 having a leg **22*a* extending perpendicular to the plate 20 and a support portion itself comprising two further legs 22*b*, 22*c*. The leg 22*b* extends parallel to the plate 20 and the end of leg 22*a* remote from the plate 20. The leg 22*c* is perpendicular to plate 20 and has its end in a slot 24, formed in the plate 20, and soldered to a printed circuit conducting strip 25 which connects with one of a row of sockets 26, constituting electrical connectors. An additional leg 22*d* of the spring 22 extends, from the end of the leg 22*a* that is adjacent the plate 20, parallel to the plate 20 and away from the support block 23. The corner 22*e* between the legs 22*a* and 22*d* is radiussed and the adjacent portion 23*a* of the support block 23 is chamfered, to facilitate insertion of the integrated circuit terminal. As the terminals of the integrated circuit module are inserted through the holes 21 they are contacted by the springs 22, the legs 22*a* of which grip the terminals by pressing them against the support block 23. Ledges 23*b* prevent excessive distortion of springs 22** while inserting the the terminals.

The design of the springs 22 is such that on attempting to withdraw one of the modules' terminals after it has been inserted through a hole 21, the grip of the connector on the terminal is increased thus preventing accidental dislodging of the module and ensuring a satisfactory connection at all times. To further enhance the quality of the connection, the springs 22 are gold plated. Thus the springs 22 and the strips 25 will conduct electricity between the integrated circuit terminals and the sockets 26.

The sockets 26 may be of known type in which a single wire can be inserted through a central aperture and gripped by a spring arrangement. Although only one socket 26 is shown connected to each strip 25, several could be provided if desired to enable more than one wire to be connected with each terminal of the integrated circuit.

However, to enable more than one wire to be connected to a single terminal 26, multiconnection devices 27 are provided on the base 10. These devices 27 are preferably of the type described in U.S. Pat. No. 3,441,899 and comprise a central conductive stud surrounded by a resilient grommet which holds the stud in an aperture formed in the base 10. Wires can be inserted between the stud and the grommet and are thus held in electrical contact with the stud. Further sockets 28 are included in the bus bar strips 12 to enable connections to be made between the bus bars and any of the terminals 26 or 27 using wire leads.

Figure 4:
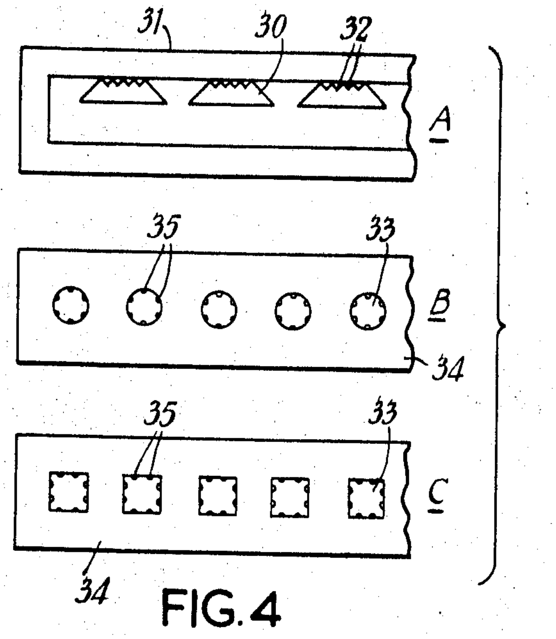

In a second embodiment of the invention the sockets 26 are replaced by multiple connection devices as illustrated in FIG. 4. When combined with the devices 27, this makes for greater versatility, or alternatively, by eliminating terminals 27, allows for greater density of integrated circuits. The example shown in FIG. 4A comprises a block 29 of nonconducting material such as synthetic resin bonded paper (SRBP), epoxy paper, epoxy glass, etc., which is formed with dovetail slots into which are inserted short metal bars 30 of corresponding dovetail cross section. A continuous strip of resilient insulating material 31 surrounds the block and covers the bars 30. A series of longitudinal grooves 32 are formed on the face of the bars in contact with the resilient material so that connecting wires can be pushed down between the strip 31 and the grooves 32.

The embodiments shown in FIGS. 4B and 4C comprise studs 33 and 33' of circular and square cross section respectively which are embedded in a block 34 of nonconducting resilient material, such as rubber, thus enabling connecting wires or discrete component leads of varying gauge to be pushed down between the stud and resilient material, thus making electrical contact with the studs. A series of longitudinal grooves 32 are formed along the side faces of the studs 33 and 33' as described in connection with FIG. 4A.

The station 16*b*, shown only in FIG. 1, does not have the springs 22 associated with each of the apertures for receiving the integrated circuit terminals. Instead, each aperture has in it a simple socket 21*a* and the conducting strips 25 printed on the plate 20 connect the sockets 21*a* with the sockets 26 respectively.

FIG. 5 shows a station 16*c* for receiving a "flatpack" type of integrated circuit module 36 as shown in FIG. 6. This type of module has pairs of coplanar terminals 37 extending from opposite sides of the module. The station 16*c* is formed on an insulating plate 20 and comprises a set series of conducting strips 38 and a rectangular aperture 39 is in the center of the plate. The strips 38 extend from opposite edges of this aperture and have the same spacing as the terminals 37 of the module. The outer end of each of the strips 38 is connected to a socket 26 as in the earlier described embodiments.

To connect the module 36 to the station 16*c*, it is positioned in the aperture 39 with the terminal 37 laid on the conducting strips 38. A clamp 40 is then positioned over the module to press the leads 37 into contact with the strips 38. This clamp 40 consists of two blocks 41 of resilient insulating material, which are held in a housing 42, for example of sheet metal. At its side edges this housing 42 is formed with depending catches (not shown) which engage in apertures 43 formed in the plate 20 of the station. This clamp is positioned so that the blocks 41 press the leads 37 on to the strips 38. It is arranged so that when the catches on the housing engage in the apertures 43, the blocks 41 are compressed so as to ensure a good connection between the leads 37 and the strips 38. The station 16*c* is interchangeable with the stations 16*a* and 16*b*, described above.

The bus bars 12 are grouped so as to provide at one end along a short side a plug 50 and at the opposing end a corresponding socket 52.

In another embodiment of the invention an additional plug and socket are provided along the long sides of the base 10 thus enabling boards to be connected together either end-to-end or side-by-side.

It can be seen that the circuit board according to the present invention is very flexible in use, in that the different circuit stations can readily be interchanged to enable an appropriate circuit layout to be achieved. The use of friction grip terminals at the stations, enables different interconnections to be speedily made without involving the use of a soldering iron.

We claim:

1. A device for facilitating the testing of experimental circuits comprising a circuit board, a plurality of printed bus bars on said board fitted with sockets into which connecting wires can be plugged, a plurality of integrated circuit receiving stations disposed among the bus bars, said stations being electrically isolated from each other and from said bus bars, each of said stations comprising a set of sockets into which connecting wires can be plugged, and means for removably mounting an integrated circuit with its terminals electrically connected to respective sockets, some of said stations being formed on individual carriers removably secured to said circuit board.

2. A device as claimed in claim 1, wherein the sockets of the receiving stations, or some of them, are in the form of multiple connection devices adapted to make electrical connections to a plurality of the electric leads.

3. A device as claimed in claim 2, including further said multiple connection devices independently distributed among the bus bars and stations.

4. A device as claimed in claim 1, wherein each carrier is a plate and the means for mounting an integrated circuit at the station comprises a plurality of apertures arranged in the plate so that the terminals of an integrated circuit can project therethrough, a spring connector mounted adjacent each aperture on the side of the board opposite to that on which the integrated circuit is to be mounted and an insulating support member fixed to the plate adjacent the spring connectors, said spring connectors being arranged to grip said terminals by pressing them against the support member.

5. A device as claimed in claim 4, wherein each spring connector comprises a leg portion which extends perpendicularly to the plate in a position to be contacted by an integrated circuit terminal (when mounted), and a support portion which extends from the end of the leg portion remote from the plate and has its end fixed to the plate and electrically connected to a said socket of the corresponding receiving station.

6. A device as claimed in claim 5, wherein the end of said leg portion is connected to an additional portion which extends substantially parallel to the plate and away from the insulating support member.

7. A device as claimed in claim 6, wherein the spring is rounded at the corner between said additional portion and said leg portion and wherein the adjacent part of the support member is chamfered to facilitate insertion of an integrated circuit terminal between the spring connector and the support member.

8. A device as claimed in claim 5, wherein said end of the support portion of the spring connector is electrically connected by a printed conducting strip to its associated socket.

9. A device as claimed in claim 1, wherein the said stations are arranged in rows, the bus bars extending from an electric plug at one side of the board to an electric socket at the opposite side of the board.